(12) United States Patent
Takada

(10) Patent No.: US 6,545,714 B1
(45) Date of Patent: Apr. 8, 2003

(54) IMAGE PICKUP APPARATUS

(75) Inventor: Katsuhiro Takada, Hidaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/257,270

(22) Filed: Feb. 25, 1999

(51) Int. Cl.$^7$ .......................... H04N 5/225; G02B 13/16
(52) U.S. Cl. ........................................ 348/340; 348/335
(58) Field of Search .......................................... 348/340

(56) References Cited

U.S. PATENT DOCUMENTS

| | | | | |
|---|---|---|---|---|
| 5,193,124 A | * | 3/1993 | Subbarao | 382/255 |
| 6,069,651 A | * | 5/2000 | Tsuyuki et al. | 348/75 |
| 6,320,648 B1 | * | 11/2001 | Brueck et al. | 355/67 |

FOREIGN PATENT DOCUMENTS

| | | | |
|---|---|---|---|
| JP | 5-347730 | 12/1993 | H04N/5/243 |
| JP | 6-153066 | 5/1994 | H04N/2/235 |
| JP | 10-148754 | 6/1998 | G02B/13/00 |
| JP | 11-8803 | 1/1999 | H04N/5/335 |

* cited by examiner

Primary Examiner—Andrew Christensen
Assistant Examiner—Tia M. Harris
(74) Attorney, Agent, or Firm—Pillsbury Winthrop LLP

(57) ABSTRACT

The present invention relates to a compact and low-cost image pickup apparatus that is capable of photographing a high-quality image comparable to silver halide photographs even when the image is enlarged to 8×10" size or larger and that enables the depth of field to be controlled with an aperture number exceeding F4. In the image pickup apparatus, an image of an object produced by an optical system (10) is formed on an electronic image pickup device (20), thereby obtaining image information concerning the object. The optical system (10) has a structure capable of obtaining an aperture number equal to or larger than F4 by reducing the beam diameter. Performance required for the optical system (10) is such that the size of the diameter of 90% encircled energy of the point spread function by amplitude is allowed to be up to about 8 times larger than the pixel pitch corresponding to the resolvable pixel unit. The pixel pitch of the image pickup device (20) is not larger than about 5 micrometers. The number of pixels is not less than about 2.5 million, which meets the resolvable pixel unit.

7 Claims, 6 Drawing Sheets

IMAGE PICKUP APPARATUS

BACKGROUND OF THE INVENTION

The present invention relates to an image pickup apparatus. More particularly, the present invention relates to a compact and low-cost image pickup apparatus that is capable of photographing high-quality images comparable to silver halide photographs and that enables the depth of field to be controlled.

There are digital cameras for business use, e.g. printing, which are capable of obtaining images comparable in quality to photographs. These digital cameras have a large number of pixels, which exceeds 2 million pixels. However, the pixel pitch of the image pickup device is as large as about 7.5 to 10 μmm or more. Accordingly, the size of the image pickup device is large, i.e. more than 1 inch. Therefore, there is a limit to the number of devices obtained from one wafer. Consequently, the cost cannot be reduced in excess of a certain limit.

The most effective way of reducing the manufacturing cost of image pickup devices is to reduce the device size so that an increased number of devices are obtained from one wafer. However, it is necessary in order to reduce the device size to reduce the number of pixels or the pixel pitch.

Many of image pickup apparatus that have been commercially manufactured as relatively low-cost apparatus use image pickup devices of ⅓ to ⅔ inch size and with about 1 to 2 million pixels. With this order of numbers of pixels, when the image is enlarged to 8×10" size (228 mm×186 mm) or more, it is impossible to obtain an image comparable in quality to photographs, as will be described later in detail.

The conventional apparatus use a lens system having satisfactory optical performance up to the Nyquist frequency, which is determined by the pixel pitch of the image pickup device. Thus, the conventional apparatus are intended to provide an image realizing the maximum resolution given by the number of pixels of the image pickup device with high efficiency.

In addition, when the apparatus need to be equipped with an optical low-pass filter in order to suppress the occurrence of a moire image and false color, the conventional practice is to adopt an arrangement taking into consideration the degradation of performance due to the low-pass filter. That is, the lens system is arranged to ensure sufficiently high optical performance to compensate for the degradation due to the low-pass filter, thereby allowing the optical low-pass filter to degrade the image-forming performance.

According to the above-described conventional method of approach, as the pixel pitch reduces, the Nyquist frequency becomes correspondingly high. Consequently, the optical performance required for the lens system becomes extremely high. In particular, if it is intended to improve the performance in the intermediate spatial frequency region, where the performance is degraded by the optical low-pass filter, the optical performance required for the lens system becomes almost the same as that of an ideal lens [see Japanese Patent Application Unexamined Publication (KOKAI) No. 10-148754].

In general-purpose image pickup apparatus, on the other hand, an aperture stop is provided in the lens system to enable appropriate photography to be carried out under a great variety of conditions. The aperture stop controls the amount of light reaching the image pickup device to obtain a correctly exposure-controlled image. If exposure is not correctly controlled, the resulting image contains many noises or becomes inferior in the detail reproduction in shadow areas.

Furthermore, if the diameter of a passing light beam is reduced by the aperture stop, the light beam is subjected to diffraction action strongly, and the point spread function by amplitude of the lens system expands. That is, so-called "diffraction unsharpness" occurs. Methods have been devised to prevent the occurrence of diffraction unsharpness [see Japanese Patent Application Unexamined Publication (KOKAI) Nos. 6-153066 and 11-8803]. According to one method, an ND filter is inserted to adjust the light quantity. According to another method, the exposure time is controlled with an electronic shutter to obtain correct exposure.

However, the effects produced by stopping down the aperture include the function of adjusting the depth of field as well as the function of adjusting the light quantity. Therefore, with the method in which the light quantity is adjusted by using an ND filter or the like, it is impossible to obtain the effect for the depth of field.

Diffraction unsharpness is a phenomenon that occurs in the optical system alone, totally independently of the pixel pitch of the image pickup device. Therefore, when the degree of unsharpness is the same, the smaller the pixel pitch, the greater the influence of diffraction unsharpness. Consequently, the image quality degrades correspondingly.

The degradation of the image quality due to diffraction unsharpness is a serious problem to the conventional idea of providing an image realizing the maximum resolution that the image pickup device possesses with high efficiency, as stated above. In particular, as the pixel pitch decreases, the effect of the image quality degradation due to diffraction unsharpness becomes stronger. Therefore, it is desirable that the aperture should not be stopped down in excess of a certain limit, or the pixel pitch should not be reduced in excess of a certain limit.

There has been provided a technique whereby even an image obtained at an aperture number at which diffraction unsharpness occurs can be made to appear sharp by subjecting the image to edge enhancement processing [see Japanese Patent Application Unexamined Publication (KOKAI) No. 5-347730]. Most of the image pickup apparatus that are commercially manufactured at present for consumer use employ the edge enhancement processing and provide images that appear sharp. Electrically, the edge enhancement processing can be applied almost unlimitedly. However, if an image is excessively subjected to the enhancement processing, when the image is enlarged, the image quality degrades extremely. Accordingly, it is desirable from the viewpoint of achieving high-quality images that the level of edge enhancement should be kept as low as possible. For this reason, the conventional image pickup apparatus for consumer use have not yet attained image quality comparable to that of silver halide photographs. Thus, with the existing commercial products and prior art, when images are enlarged to 8×10" size or larger, it is impossible to obtain images comparable in quality to silver halide photographs. In addition, according to the conventional method of approach, the pixel pitch cannot be reduced in excess of a certain limit. Therefore, it is difficult to achieve a favorably compact apparatus. Alternatively, the aperture number cannot be increased, and thus the depth of field cannot be controlled. Therefore, it is impossible to attain a compact and low-cost image pickup apparatus capable of obtaining high-quality images comparable to silver halide photographs.

SUMMARY OF THE INVENTION

In view of the above-described problems associated with the prior art, an object of the present invention is to provide a compact and low-cost image pickup apparatus that is capable of photographing a high-quality image comparable to silver halide photographs even when the image is enlarged to 8×10" size or larger and that enables the depth of field to be controlled with an aperture number exceeding F4.

To attain the above-described object, the present invention provides an image pickup apparatus wherein an image of an object produced by an optical system is formed on an electronic image pickup device, thereby obtaining image information concerning the object. The optical system has a structure capable of obtaining an aperture number equal to or larger than F4 by reducing the diameter of a light beam. The image pickup apparatus satisfies the following conditions:

$$1.5 < \phi/P \times \sqrt{(2.5/N)} < 8.0 \tag{1}$$

$$0.0015 < P < 0.0055 \text{ [millimeter]} \tag{2}$$

$$2.4 < N < 20 \text{ [million]} \tag{3}$$

where $\phi$ is the size (given in millimeters) of the diameter of 90% encircled energy of the point spread function by amplitude of the optical system approximately at the center of the image plane, exclusive of the low-pass action by an optical low-pass filter, for the wavelength of e-line at an aperture number of F5.6; N is the number of pixels (given in million) of the image pickup device; and P is the pixel pitch (given in millimeters) of the image pickup device.

In this case, it is desirable for the image pickup apparatus to satisfy the following condition at all focus positions that may be used:

$$|H/L| < 0.20 \tag{6}$$

where H is the diagonal length of an image pickup surface of the image pickup device that is concerned with image generation, and L is the distance measured from the image pickup surface to the exit pupil position of the optical system. When the optical system is a zoom lens system, L is the distance from the image pickup surface to the exit pupil position closest to the image pickup surface between the wide-angle end and the telephoto end.

It is also preferable to satisfy the following condition:

$$2.0 < \phi/P \times \sqrt{(2.5/N)} < 6.5 \tag{4}$$

It is also preferable to satisfy the following condition:

$$3 < H < 17 \text{ [millimeter]} \tag{9}$$

where H is the diagonal length of an image pickup surface of the image pickup device that is concerned with image generation.

In this case, it is even more desirable to satisfy the following condition:

$$4.2 < H < 12 \text{ [millimeter]} \tag{10}$$

Furthermore, it is preferable not to use an optical low-pass filter.

It should be noted that the above-described image pickup apparatus should desirably be arranged as a color image pickup apparatus.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
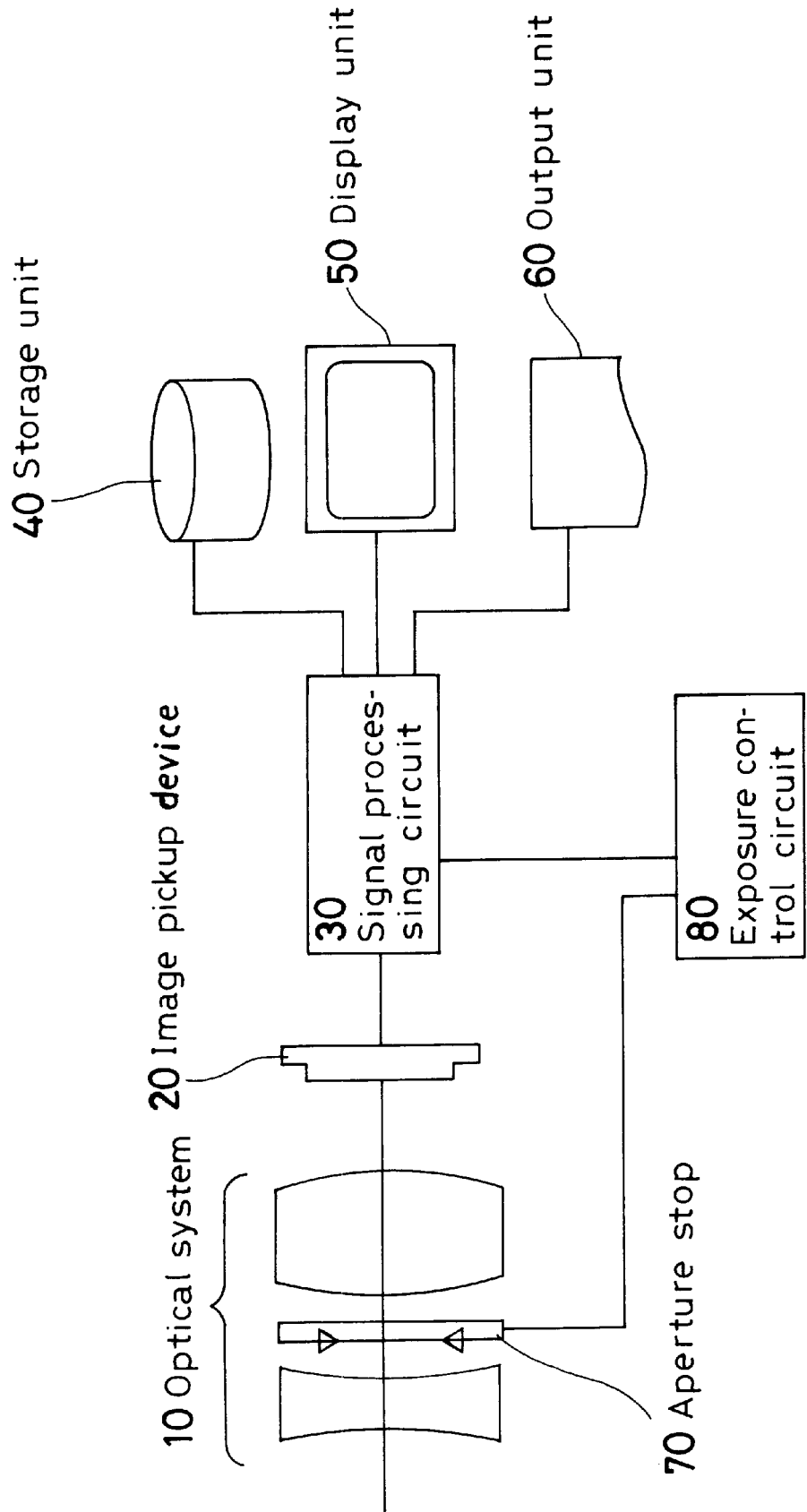
FIG. 1 is a diagram showing the whole arrangement of the image pickup apparatus according to the present invention.

The reasons for adopting the above-described arrangement in the present invention, together with the function thereof, will be described below.

Assuming that the standard angular resolution of the human eye is 1' (corresponding to the visual acuity 1.0), because this is a value that provides the critical resolution, resolution at which a line-and-space pattern contained in an image can be recognized as a sharp image is considered to be lower (larger in angle) than the above-described angular resolution.

For example, if the solid angle of the resolution is assumed to be about 1.67' (corresponding to the visual acuity 0.6), when an image is observed from a position 40 centimeters away from it, for example, it can be recognized as a sharp image down to a size of 0.194 millimeters. Accordingly, in a case where a print of A4 size (210 mm×297 mm) is observed from a position 40 centimeters away from it, the number of pixels required for the A4-size print is about 1,100×1,500=1,650,000 pixels to recognize the print image as a sharp image. This numerical value is for the A4 full-size print. Assuming that a margin of about 10 millimeters is left at each of the peripheral edges of the print, the number of pixels required is about 1,400,000 pixels. If the number of pixels is less than this value, the dots of the print are clearly recognizable. Therefore, an edge image, for example, fails to appear to be a straight line, or changes in density give a "stairstep" appearance. Accordingly, the image is recognized as being of low quality.

Even when the amount of data is small, if the data is subjected to interpolation processing when outputted to produce a print, it is possible to increase the number of pixels of the image. However, the image quality unavoidably degrades during the interpolation processing, causing unfavorable phenomena such as blunting of edges. Accordingly, the image thus produced is much inferior in quality to the image produced by directly outputting the above-described number of pixels.

In general, there is a correlation between the size of an image such as a print and the viewing distance. It is natural that a small image should be observed from a short distance, whereas a large image should be observed from a relatively long distance. If the relationship between the image size and the viewing distance is linear, sharpness recognized by man is determined by not the pixel size but the above-described solid angle. Therefore, although in the foregoing the necessary number of pixels is calculated on the basis of an image of A4 size, the same result is obtained even if calculation is performed with respect to different sizes of images.

However, in the case of an extremely small image, e.g. an image of A6 size (105 mm×149 mm), the actual viewing distance is often longer than a distance obtained from the above-described relationship as compared to the distance at which an image of A4 size is observed. Accordingly, for a small image size, e.g. A6 size, the necessary number of pixels is less than the above-described 1,650,000 pixels.

Incidentally, in the case of an image produced by using an image pickup device, pixel units that constitute the image are fixed naturally. Therefore, it is impossible to express an object having a spatial frequency higher than the pixel units. When a test chart having pattern portions with various spatial frequencies is photographed, patterns whose narrowest line width is equal to the pixel pitch are all observed entirely resolved. However, in the case of patterns having a spatial frequency higher than the pixel units, in which the line width is less than the pixel pitch and the narrowest line width is equal to ½ of the pixel pitch, only low-frequency light and dark patterns, i.e. more, can be observed.

In the case of an image with the number of pixels obtained by the above-described calculation, the smallest pixel units of the print can be clearly recognized by man with high contrast. Accordingly, when the results of the above-described test chart observation are extended to apply to an ordinary image, the image appears sharp up to a certain spatial frequency, but it rapidly becomes impossible to resolve image components having spatial frequencies higher than the smallest pixel units. Therefore, it cannot be recognized as an image satisfactorily representing the gradation, although the contrast of the image is high. Thus, the image appears rough.

On the other hand, silver halide photographs are formed from grains of various sizes, ranging from a grain size below the limit of resolution for the human perception to a grain size large enough for man to recognize the grains sharply. It is considered that the grains of various sizes allow representation of not only the contrast of the image but also the gradation of the image and give a significant effect to the high quality feeling of the image. Accordingly, images with the above-described number of pixels cannot be said to have attained the image quality of photographs.

To obtain an image of abundant gradation, it is necessary to represent spatial frequencies up to one close to the resolution limit for the human perception.

Noting the above-described matter, we examined the size of pixel units necessary for image quality to be regarded as being equal to that of silver halide photographs. As a result, we found that pixel units corresponding to the above-described solid angle of 1.67' cannot sufficiently serve as the smallest pixel units for forming the image, and it is necessary to use pixel units corresponding to a solid angle of at least 1.25' (visual acuity 0.8). It is, as a matter of course, preferable to provide pixel units corresponding to 1' resolution, which is the limit of resolution. In order to further improve the feeling of image quality, it is preferable to provide pixel units with which resolution less than 1' can be attained.

Hereinafter, the size of pixel units corresponding to a solid angle at which an image can be recognized as sharp will be referred to as "good image limit pixel unit". The size of pixel units corresponding to a solid angle necessary for giving a sense of gradation will be referred to as "resolvable pixel unit". The size of pixel units corresponding to the limit of resolution will be referred to as "resolution limit pixel unit". The relationship between the above-described pixels units is as follows: The good image limit pixel unit>the resolvable pixel unit>the resolution limit pixel unit.

When this expression is used, the above-described result is as follows. Assuming that the resolution limit 1', the resolvable pixel unit needs to be smaller than the size of pixel units corresponding to a solid angle of 1.25'. In this case, if the necessary number of pixels is obtained by a method similar to the above, it is about 3 million pixels for the full size (A4) of paper. When the margins are taken into consideration, about 2.5 million pixels are needed.

In this case, it is important to note that the image does not always need to be of high contrast up to a spatial frequency corresponding to the resolvable pixel unit. More specifically, it is necessary to realize high contrast up to a spatial frequency corresponding to the good image limit pixel unit. However, it is impossible for man to recognize frequencies higher than that with high contrast. Therefore, lowering of the contrast of the image does not interfere with representing the gradation of the image.

Accordingly, in a case where the resolvable pixel unit and each pixel of the image pickup device are in one-to-one correspondence to each other, for example, the image-forming performance of the optical system does not necessarily need to have high contrast performance at a spatial frequency corresponding to the pixel pitch of the image pickup device, i.e. Nyquist frequency.

In a case where the pixel pitch of the image pickup device is smaller than the resolvable pixel unit, i.e. when the image pickup device has the number of pixels that is larger than the number of pixels necessary for an image, it suffices to take into consideration the pixel pitch corresponding to the resolvable pixel unit, but not the pixel pitch of the image pickup device.

Let us turn our viewpoint from the number of pixels to the pixel pitch. The present invention makes mention of not simply increasing the number of pixels but how the number of pixels will be increased. In addition, the present invention gives consideration to image-forming performance required for the optical system when the number of pixels is increased.

The present invention proposes to increase the number of pixels by reducing the pixel pitch of the image pickup device. The effect of the reduction in the pixel pitch on the optical performance will be shown below.

In the case of an electronic image pickup system, an image with a contrast given by the transfer function of the optical system is not obtained. The photoelectric conversion part of the image pickup device, that is, the aperture part of the image pickup device, has a finite area, and the amount of light is averaged at the aperture part. Therefore, the transfer function degrades according to the size of the aperture part.

Figure 8:
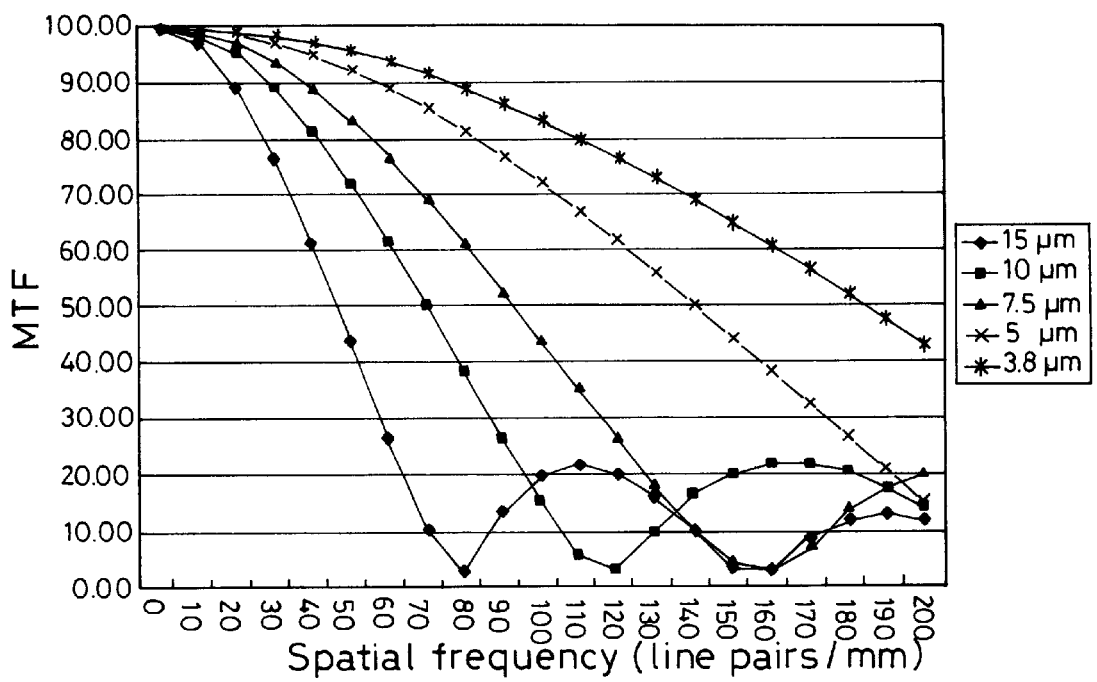
FIG. 8 is a diagram showing the transfer function of an electronic image pickup system.

If the aperture part is approximated by a rectangle for the sake of simplicity, as shown in FIG. 8, the degradation of the transfer function may be represented in the form of a sinc function by Fourier transform. It should be noted that the area ratio of the size of the aperture part to the pitch, i.e. aperture efficiency, is assumed to be 70%.

Figure 9:
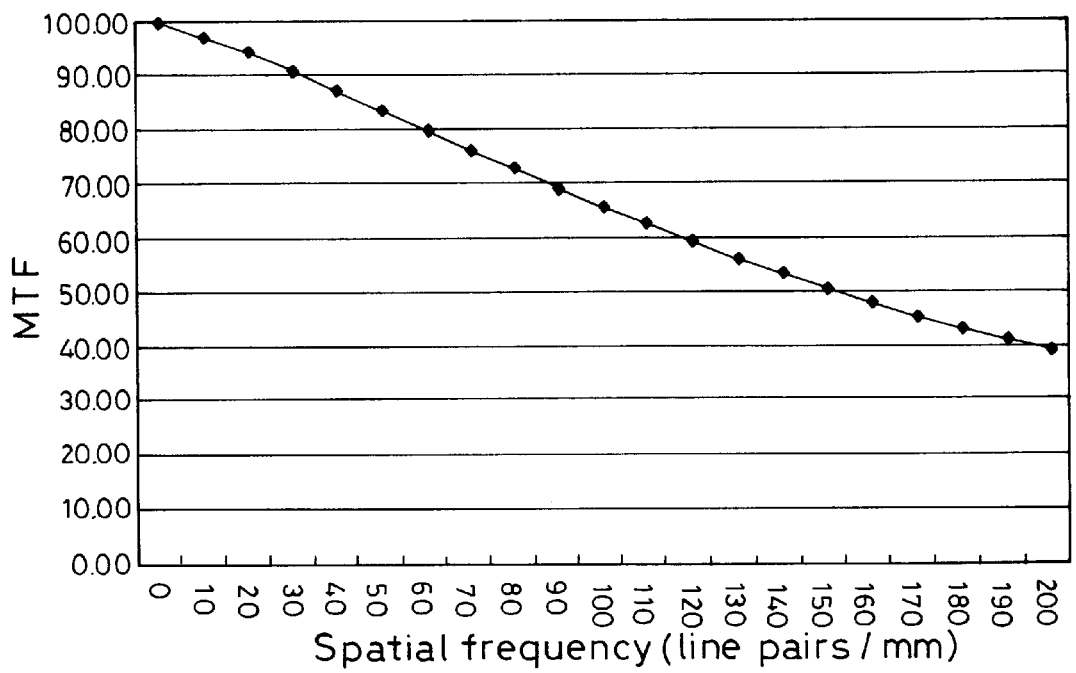
FIG. 9 is a diagram showing the MTF characteristics of an optical system.
Figure 10:
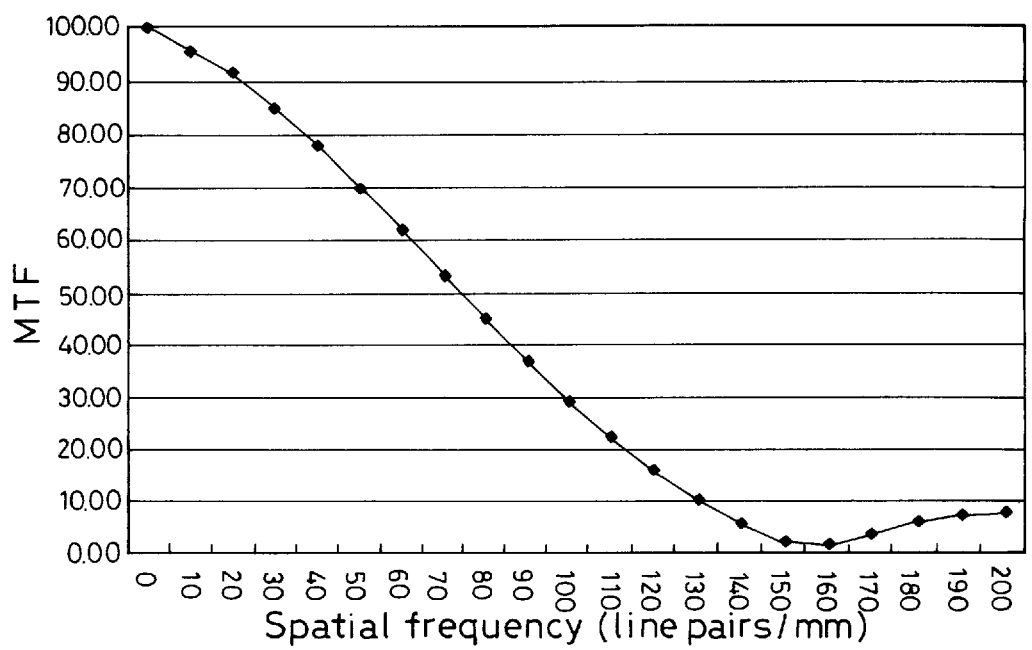
FIG. 10 is a diagram showing the overall MTF characteristics when the pitch is 7.5 micrometers.

For example, in a case where photography is performed with an optical system having MTF characteristics as shown in FIG. 9 using an image pickup device having a pitch of 7.5 micrometers, a device size of 2/3 inch and about 1 million pixels, overall MTF characteristics determined by taking into consideration the degradation at the aperture are such as those shown in FIG. 10 (the overall MTF characteristics being determined by multiplying together the value of the curve for a pitch of 7.5 micrometers shown in FIG. 8 and the value of the curve shown in FIG. 9).

Then, let us assume that about 2.3 million pixels are attained with the same device size by reducing the pixel pitch to 5 micrometers with the above-described characteristics taken into consideration. In this case, if the optical system having the MTF characteristics shown in FIG. 9 is used as in the case of the above, overall MTF characteristics as determined by taking into consideration the degradation at the aperture are such as those shown in FIG. 11 (the overall MTF characteristics being determined by multiplying together the value of the curve for a pitch of 5 micrometers shown in FIG. 8 and the value of the curve shown in FIG. 9).

Figure 11:
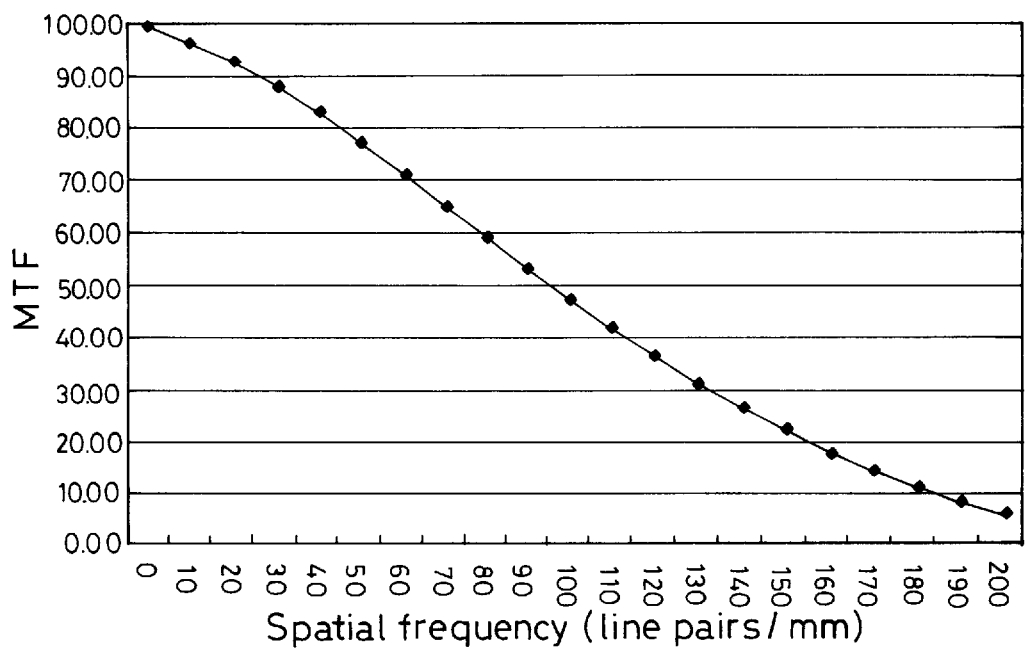
FIG. 11 is a diagram showing the overall MTF characteristics when the pitch is 5 micrometers.

As will be clear from FIGS. 10 and 11, reducing the pixel pitch suppresses the degradation of the transfer function at the aperture part of the image pickup device and causes the overall optical performance to become higher rather than lower. Accordingly, by setting an appropriate number of pixels based on the discussion of the number of pixels and attaining the set number of pixels by reduction in the pixel pitch, performance that should be ensured by the optical system alone is allowed to be lower than a level predicted by the conventional technique whereby the degradation of the transfer function at the aperture part of the image pickup device is covered by previously increasing the performance by an amount corresponding to the degradation.

As a result of the examination of the performance required for the optical system of the image pickup apparatus, we found that the size of the diameter of 90% encircled energy of the point spread function by amplitude is allowed to be up to about 8 times larger than the pixel pitch corresponding to the resolvable pixel unit. If this limit is exceeded, the contrast lowers to a considerable extent, and it becomes impossible to obtain resolution even at the spatial frequency corresponding to the good image limit pixel unit. Consequently, it is impossible to obtain a high-quality image, which is the object of the present invention. It should, however, be noted that the optical system is not prohibited from having high optical performance.

In view of the size of the image pickup apparatus and the cost of the image pickup device, it is desirable that the pixel pitch should be not larger than about 5 micrometers. A pixel pitch larger than about 5 micrometers causes the device size to become large when the above-described number of pixels is ensured, making it difficult to attain a reduction in cost of the image pickup device and a reduction in size of the apparatus.

The foregoing discussion may be expressed as follows:

$$1.5 < \phi P \times \sqrt{(2.5/N)} < 8.0 \quad (1)$$

$$0.0015 < P < 0.0055 \text{ [millimeter]} \quad (2)$$

$$2.4 < N < 20 \text{ [million]} \quad (3)$$

where $\phi$ is the size (given in millimeters) of the diameter of 90% encircled energy of the point spread function by amplitude (i.e. the diameter of the circle of a point image on the image plane that contains 90% of the amount of incident light reaching the image plane) of the optical system approximately at the center of the image plane, exclusive of the low-pass action by an optical low-pass filter, for the wavelength of e-line at an aperture number of F5.6; N is the number of pixels (given in million) of the image pickup device; and P is the pixel pitch (given in millimeters) of the image pickup device.

The above condition (1) is a condition that should be satisfied when the number of pixels calculated from the resolvable pixel unit is 2.5 million pixels as stated above. If $\phi/P \times \sqrt{(2.5/N)}$ is not larger than the lower limit of the condition (1), i.e. 1.5, the image becomes high in quality because the optical performance of the optical system increases. However, it becomes necessary to increase the number of constituent lens elements in order to obtain the desired performance. Alternatively, it is necessary to increase the size of the lens system so as to control the amount of aberration produced in each lens or to take other measures. In either case, it is unfavorable from the viewpoint of reducing the cost and size of the lens system. Alternatively, it becomes necessary to provide fine manufacturing tolerances and hence difficult to reduce the cost of the lens system. If $\phi/P \times \sqrt{(2.5/N)}$ is not smaller than the upper limit of the condition (1), i.e. 8, the contrast lowers to a considerable extent, as stated above, and it becomes impossible to obtain resolution even at the spatial frequency corresponding to the good image limit pixel unit. Consequently, it is impossible to obtain a high-quality image.

If the pixel pitch is not larger than the lower limit of the condition (2), i.e. 0.0015 millimeters, it becomes impossible to produce an optical lens that satisfies the condition (1). If the pixel pitch is not smaller than the upper limit of the condition (2), i.e. 0.0055 millimeters, it becomes impossible to achieve a compact image pickup apparatus, and the cost of the image pickup device becomes unfavorably high.

The upper limit of the condition (3) is provided by taking into consideration the size of image data obtained. If the number of pixels is not smaller than the upper limit, i.e. 20 million, an extremely large storage capacity is required for a medium to hold information for one image. Therefore, in order to store the image information in a medium having a small storage capacity, it is necessary to increase the compression ratio. Consequently, the image quality degrades unavoidably, which is contrary to the purpose of the present invention. In a case where a device for writing information to a large-capacity storage medium is incorporated in the image pickup apparatus, the whole apparatus becomes extremely large in size, which is also contrary to the purpose of the present invention. When the amount of image information is excessively large, the transfer speed of image data and the writing speed to the medium lower remarkably. This is considerable hindrance to the maneuverability of the image pickup apparatus. If the number of pixels is not larger than the lower limit of the condition (3), i.e. 2.4 million, it becomes less than the number of pixels that meets the resolvable pixel unit. Consequently, it is difficult to provide a high-quality image of abundant gradation.

Considering the balance among the high-quality image, the performance required for the optical system and the cost of the apparatus, it is preferable to satisfy the following condition to obtain an image of sufficiently high quality with a low-cost optical system:

$$2.0 < \phi P \times \sqrt{(2.5/N)} < 6.5 \tag{4}$$

As to the pixel pitch, it is preferable to satisfy the following condition:

$$0.002 < P < 0.0052 \text{ [millimeter]} \tag{5}$$

In the case of using an image pickup device with a small pixel pitch according to the present invention, it is required that the exit pupil position of the optical system should be set moderately far. As the pixel pitch reduces, the square measure of the photoelectric conversion area decreases. Consequently, the amount of light entering the photoelectric conversion area becomes small, and hence the sensitivity of the image pickup apparatus reduces unfavorably. Therefore, a method is adopted wherein microlenses are provided at the top of the image pickup surface so that light in an area wider than the photoelectric conversion surface is condensed efficiently onto the photoelectric conversion surface. Accordingly, when light is incident on the image pickup surface extremely obliquely, the amount of light entering the photoelectric conversion surface decreases. Consequently, the image becomes undesirably dark.

Accordingly, it is desirable that the optical system used in the image pickup apparatus according to the present invention should satisfy the following condition at all focus positions that may be used:

$$|H/L| < 0.20 \tag{6}$$

where H is the diagonal length of the image pickup surface of the image pickup device that is concerned with image generation, and L is the distance measured from the image pickup surface to the exit pupil position of the optical system. When the lens system is a zoom lens system, L is the distance from the image pickup surface to the exit pupil position closest to the image pickup surface between the wide-angle end and the telephoto end.

In a case where an image pickup apparatus with particularly high general-purpose properties or an image pickup apparatus with a particularly small pixel pitch is used, it is desirable that the angle of light incident on the image pickup surface should be still smaller. Therefore, it is more desirable to satisfy the following condition:

$$|H/L| < 0.17 \tag{7}$$

It is even more desirable to satisfy the following condition:

$$|H/L| < 0.15 \tag{8}$$

As to the device size, on the other hand, it is desirable to satisfy the following condition:

$$3 < H < 17 \text{ [millimeter]} \tag{9}$$

If the size of the image pickup device is reduced to such an extent that H is not larger than the lower limit of the condition (9), i.e. 3 millimeters, the pixel pitch for obtaining the necessary number of pixels becomes excessively small, and the condition (2) is not satisfied. If H is not smaller than the upper limit, i.e. 17 millimeters, the image pickup apparatus becomes large in size. Alternatively, it becomes difficult to reduce the cost of the image pickup device, which is contrary to the purpose of the present invention.

It is more desirable to satisfy the following condition:

$$4.2 < H < 12 \text{ [millimeter]} \tag{10}$$

The upper and lower limits of the condition (10) correspond to the upper and lower limits of the condition (5).

When the pitch on the image pickup device that corresponds to the resolvable pixel unit and the actual pitch of each pixel of the image pickup device are related to each other in the length ratio 3:1 or less, it is possible to obtain a high-quality image comparable in quality to photographs, which is the object of the present invention, with the minimum required number of pixels. If the ratio is higher than the above, the number of pixels that the image pickup device possesses is excessively larger than the necessary number of pixels. This is wasteful in terms of the number of data items, although favorable for the improvement in image quality.

The resolution of eye differs among individuals. Therefore, in order for as many users as possible to recognize an image as being of high quality, it is desirable to further reduce the good image limit pixel unit and the resolvable pixel unit.

If the resolvable pixel unit is set to a size corresponding to a solid angle of about 1.11' (corresponding to the visual acuity 0.9), it is possible to obtain an image that is sufficiently good for appreciation in the form of a print of a size exceeding 8×10" size even as compared with a printed image photographed with 35-mm slow-speed silver halide film (24 mm×36 mm) or an image photographed with Brownie film (60 mm×90 mm). The number of pixels required in this case is about 3.7 million pixels for the full size of paper and about 3.1 million pixels when margins are left.

That is, it is preferable to satisfy the following condition:

$$3 < N < 20 \text{ [million]} \tag{11}$$

If the resolvable pixel unit is set to a size corresponding to a solid angle of about 1' (corresponding to the visual acuity 1.0), it is possible to obtain an image that is sufficiently good for appreciation in the form of a print of a size exceeding 8×10" size even as compared with a printed image photographed with Brownie slow-speed silver halide film or an image photographed with film of 4×5 inch size. The number of pixels required in this case is about 4.6 million pixels for the full size of paper and about 3.9 million pixels when margins are left.

Therefore, it is even more desirable to satisfy the following condition:

$$3.8 < N < 20 \text{ [million]} \tag{12}$$

If there are pixel units finer than the resolution, the viewer senses the gradation abundantly, although he or she no longer recognizes each pixel. Therefore, it is preferable that there should be such fine pixel units from the viewpoint of obtaining a high-quality image.

As a result of satisfying the above-described conditions in the present invention, MTF at the Nyquist frequency lowers, and the density of the moire is effectively controlled. Accordingly, it becomes unnecessary to provide an optical low-pass filter and hence possible to eliminate the cause of degradation of the optical performance at intermediate spatial frequencies.

In the-case of a 1-chip image pickup apparatus in which a color image is captured through a mosaic color filter array placed on the photoelectric conversion part of the image pickup device, and in which false color associated with pixelization is corrected in particular, it is desirable that the diameter of 90% encircled energy of the point spread function by amplitude at the center of the image plane, exclusive of the low-pass action by an optical low-pass filter, for white color according to the spectral transmittance of each color filter at an aperture number of F5.6 should be not less than double the pitch between each pair of adjacent color filters of the same color.

If arranged as stated above, the apparatus does not always need an optical low-pass filter for the purpose of controlling false color. This is favorable for achieving a further reduction in the cost.

In the case of a 1-chip color image pickup apparatus, image information concerning only a specific color is obtained from each pixel of the image pickup device. Therefore, the common practice is to generate RGB or CMY information at the position of each pixel by using information from the surrounding pixels. Accordingly, it is desirable that the number of pixels of the image pickup device should be at least equal to or larger than the above-described necessary number of pixels. To obtain an image of higher quality, it is more desirable that the number of pixels of the image pickup device should be not less than 1.5 times the necessary number of pixels. If so, a high-quality image can be obtained even in view of the degradation of the image quality due to pixelization processing.

Adopting the arrangement of the present invention makes it possible to obtain an image of somewhat high quality without carrying out edge enhancement processing. Thus, edge enhancement processing becomes unnecessary. Accordingly, the arrangement of the present invention enables the processing circuit to be simplified effectively. Alternatively, the image degradation due to edge enhancement processing can be suppressed by lowering the edge enhancement processing level. Therefore, it becomes possible to obtain a high-quality image even when the image is enlarged.

In order to obtain a high-quality image, which is comparable in quality to photographs, with an image pickup apparatus arranged according to the present invention, it is desirable to use a lens system including a mechanism that varies the aperture number by reducing the beam diameter, i.e. a stop device. In this case, in order for the image to reflect a change in the depth of field caused by the stop, it is desirable for the mechanism to be capable of stopping down the aperture in excess of F4.

If the mechanism is capable of stopping down the aperture in excess of F5.6, it is possible to effect control over the range of from a shallow depth of field to a deep depth of field. Thus, when a lens system having a long focal length is used in particular, it is possible to photograph an image with a deep depth of field. It is more desirable for the mechanism to be capable of stopping down the aperture in excess of F8.

Examples of the above-described image pickup apparatus according to the present invention will be described below.

The whole arrangement of the image pickup apparatus according to the present invention is shown in FIG. 1. As shown in the figure, the image pickup apparatus includes an optical system 10 that forms an image of an object, an image pickup device 20, e.g. a CCD, placed at the image-formation position of the optical system 10, a signal processing circuit 30 that processes an image signal obtained from the image pickup device 20, a storage unit 40 connected to the signal processing circuit 30 to store obtained image data, a display unit 50 connected to the signal processing circuit 30 to display the obtained image, and an output unit 60, e.g. a printer, which outputs the obtained image.

The optical system 10 has an aperture stop 70 arranged such that the size of the aperture centered at the optical axis of the optical system 10 can be varied by moving a plurality of blades (not shown). An amount of light that the image pickup device 20 should read is correctly controlled by an exposure control circuit 80 that controls both the size of the aperture of the aperture stop 70 and the exposure time for the image pickup device 20.

For the exposure control by the combination of the aperture size and the exposure time, the system is arranged as follows. An aperture number and exposure time may be automatically set by the exposure control circuit 80 through photometry carried out for the object condition. Alternatively, the user sets an aperture number or exposure time as desired, and exposure time or an aperture number is automatically controlled in accordance with the set aperture number or exposure time. It is also possible for the user to set both an aperture number and exposure time as desired.

The following is a description of Examples 1 and 2 regarding mainly a lens system used as the optical system 10 and the image pickup device 20 used in accordance with the lens system.

EXAMPLE 1

In this example, a fixed focal length lens system is used as the optical system 10. An image pickup device used as the image pickup device 20 is as follows: The device size is ⅓ inch (4.8 mm×3.6 mm); the diagonal length H of the image pickup surface is 6.0 millimeters; the number of pixels is 1,830×1,370=2,507,000 pixels; and the pixel size P is 2.63 micrometers.

Figure 2:
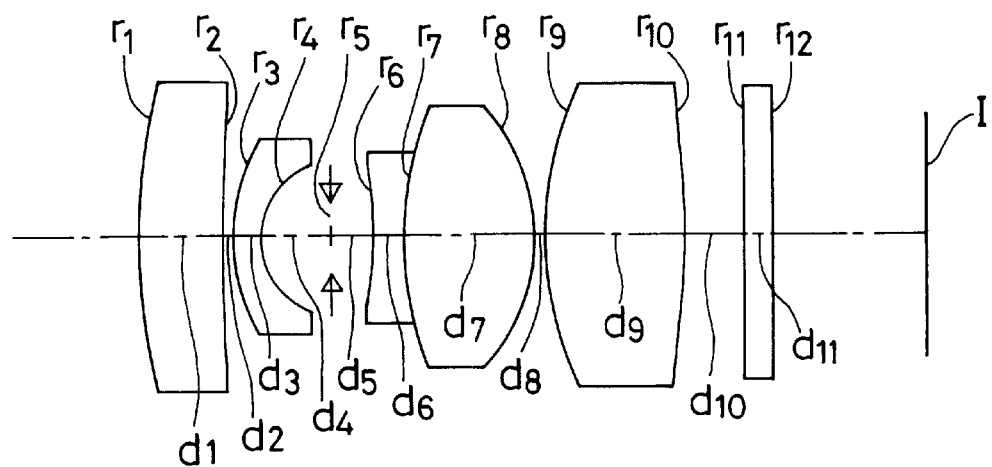
FIG. 2 is a sectional view of a lens system that constitutes an optical system in Example 1 of the present invention.
Figure 3:
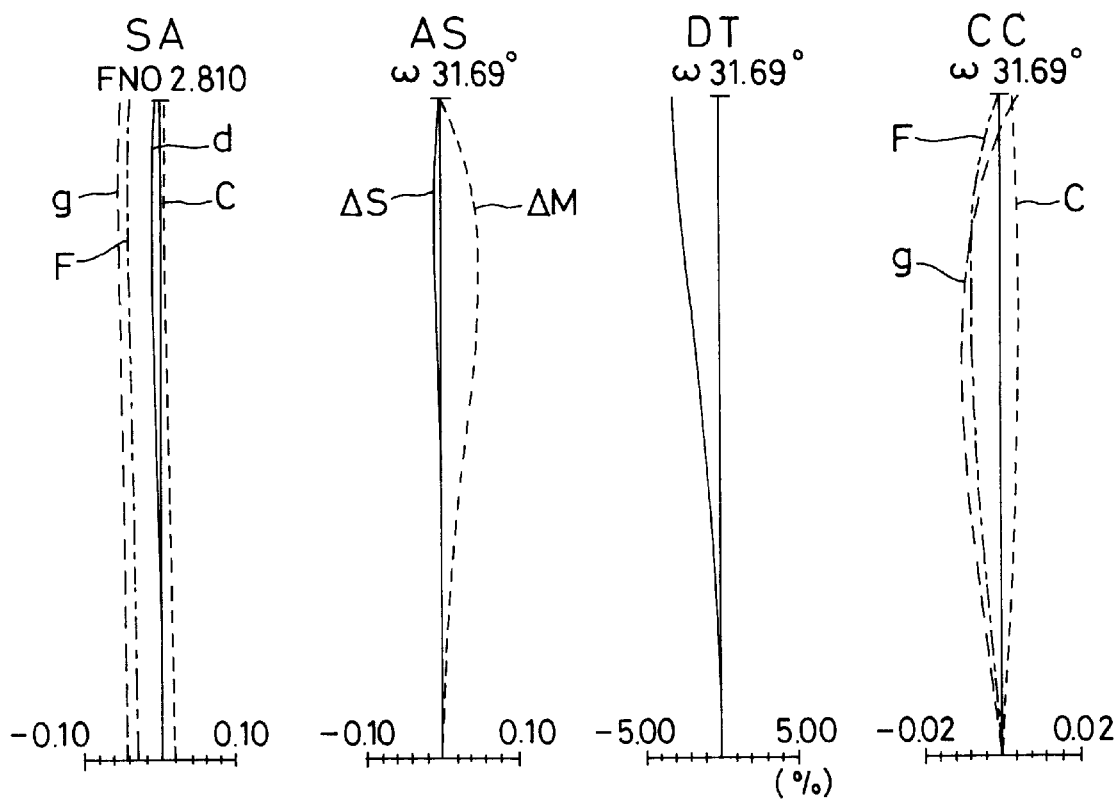
FIG. 3 is an aberrational diagram illustrating aberrations in the lens system according to Example 1.

The lens system that constitutes the optical system 10 is a retrofocus type fixed focal length lens system as shown in the sectional view of FIG. 2. The lens system includes, in order from the object side, a positive meniscus lens having a convex surface directed toward the object side, a negative meniscus lens having a convex surface directed toward the object side, a stop, a cemented lens consisting essentially of a biconcave lens and a biconvex lens, and a biconvex lens. A plane-parallel plate, which constitutes a cover glass and filters of the image pickup device 20, is placed between the lens system and the image plane I. Numerical data of this lens system will be shown later. An a spherical surface is used for the surface closest to the image plane. Aberrations in this example are shown in FIG. 3. In the aberrational diagram, SA denotes spherical aberration; AS denotes astigmatism; DT denotes distortion; and CC denotes lateral chromatic aberration (the same shall apply in the following aberrational diagrams). In the diagram, "ω" denotes half field angle.

In Example 1, the value concerning the condition (1) is $\phi/P \times \sqrt{(2.5/N)} = 4.58$. The value concerning the condition (2) is P=0.00263 millimeters. The value concerning the condition (3) is N=2.507 million. The value concerning the condition (6) is |H/L|=0.109. Thus, Example 1 satisfies all the conditions. Accordingly, it is possible to obtain a compact and low-cost image pickup apparatus wherein even when an image obtained is enlarged to 8×10" size or larger, it is possible to obtain a high-quality image that is comparable to silver halide photographs. In addition, the depth of field can be controlled with an aperture number exceeding F4. It should be noted that this example is arranged such that the aperture size can be stepwisely or continuously adjusted from the F-number at the full aperture to the neighborhood of F16.

EXAMPLE 2

In this example, a zoom lens system is used as the optical system 10. An image pickup device used as the image pickup device 20 is as follows: The device size is ⅔ inch (8.8 mm×6.6 mm); the diagonal length H of the image pickup surface is 11.0 millimeters; the number of pixels is 2,095×1,570=3,289,000 pixels; and the pixel size P is 4.2 micrometers.

Figure 4:
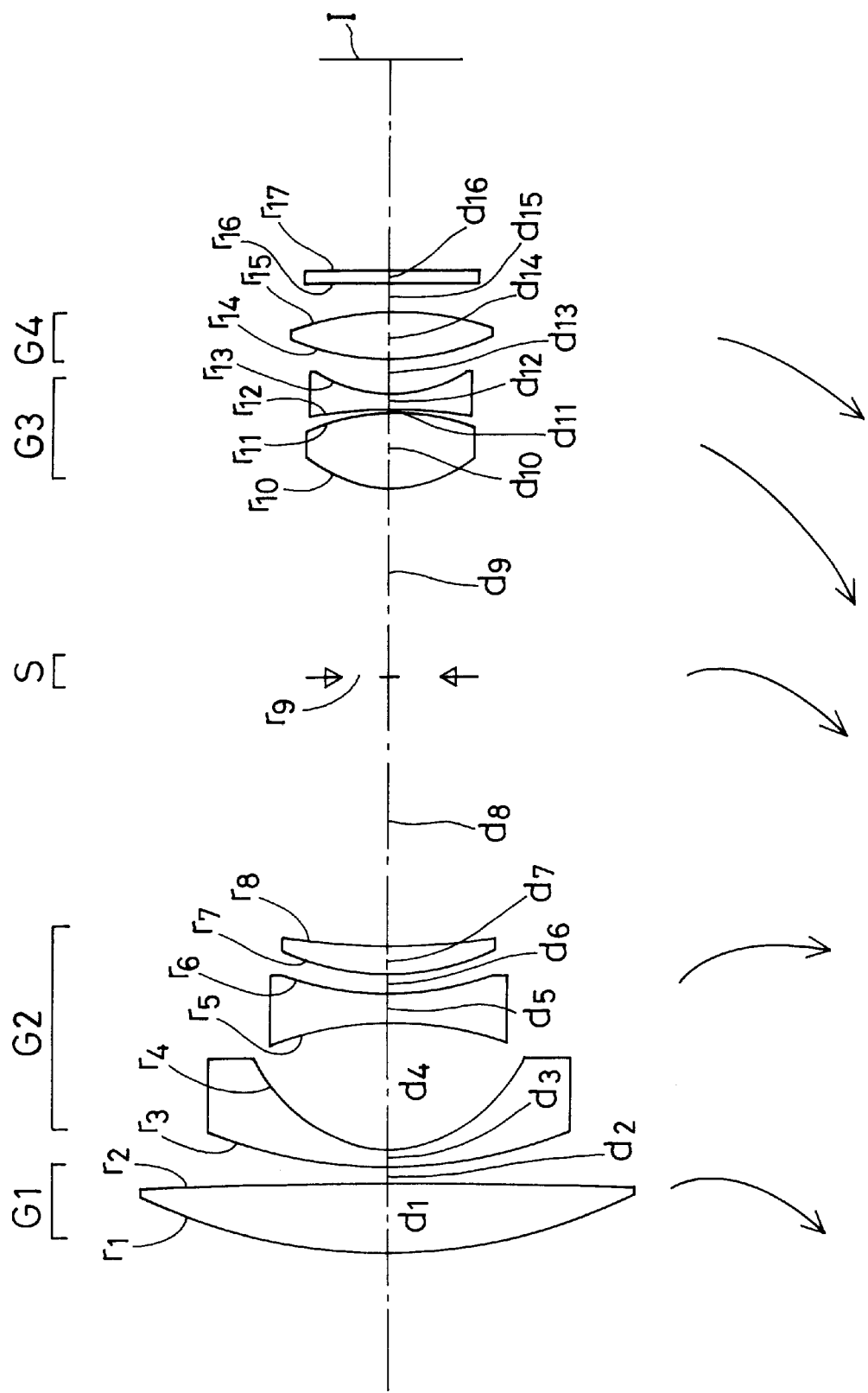
FIG. 4 is a sectional view of a zoom lens system constituting an optical system in Example 2 of the present invention, showing the zoom lens system at the wide-angle end.
Figure 5:
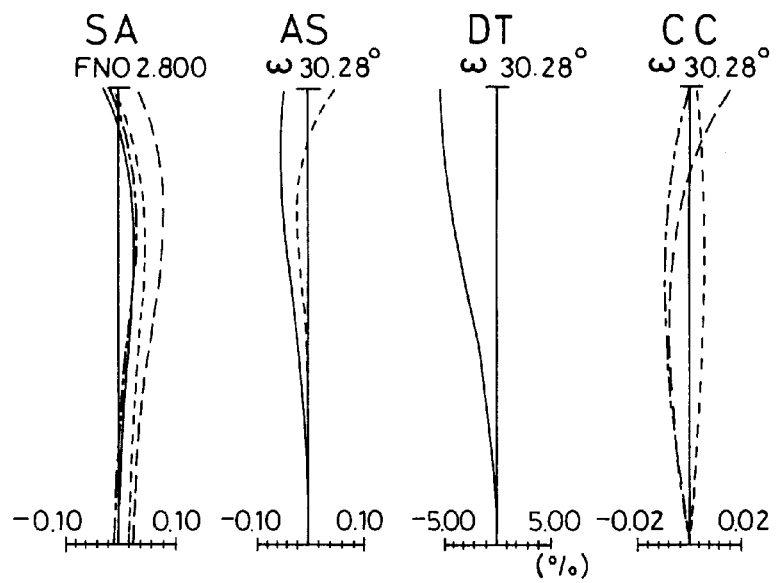
FIG. 5 is an aberrational diagram illustrating aberrations produced at the wide-angle end of the zoom lens system in Example 2.
Figure 6:
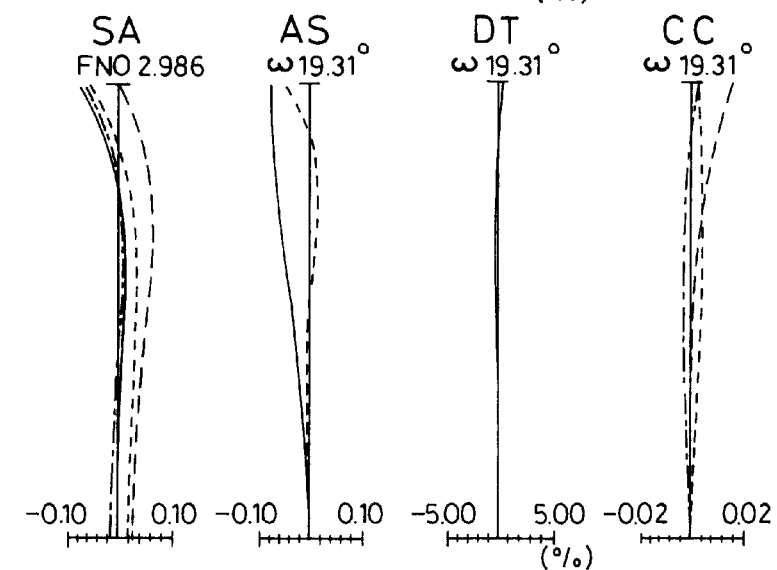
FIG. 6 is an aberrational diagram illustrating aberrations produced at the standard position of the zoom lens system in Example 2.
Figure 7:
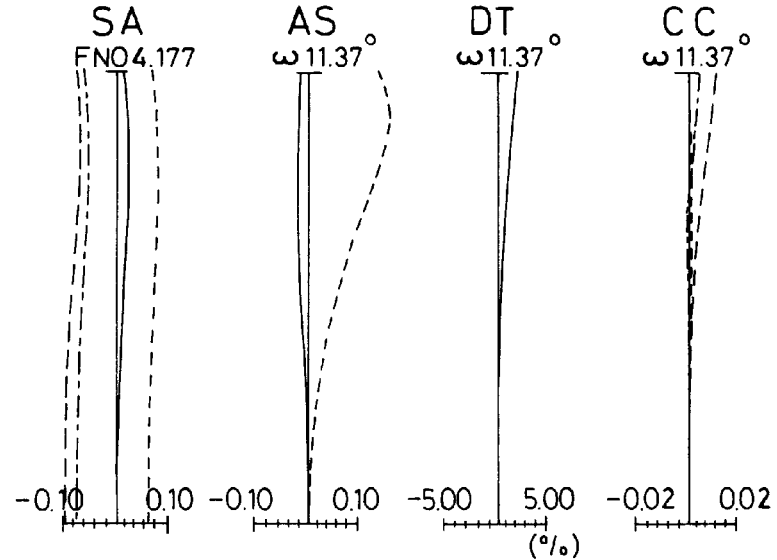
FIG. 7 is an aberrational diagram illustrating aberrations produced at the telephoto end of the zoom lens system in Example 2.

FIG. 4 is a sectional view of the zoom lens system that constitutes the optical system 10, showing the zoom lens system at the wide-angle end. As shown in the figure, the zoom lens system includes, in order from the object side, a first lens unit G1, a second lens unit G2, a stop S, a third lens unit G3, and a fourth lens unit G4. The first lens unit G1 has a single biconvex lens. The second lens unit G2 has three lenses, i.e. a negative meniscus lens having a convex surface directed toward the object side, a biconcave lens, and a positive meniscus lens having a convex surface directed toward the object side. The third lens unit G3 has two lenses, i.e. a biconvex lens and a biconcave lens. The fourth lens unit G4 has a single biconvex lens. From the wide-angle end to the telephoto end, the first lens unit G1, the second lens unit G2 and the stop S each move along a locus that is concave toward the object side. The third lens unit G3 and the fourth lens unit G4 move toward the object side while widening the spacing therebetween. A plane-parallel plate, which constitutes a cover glass and filters, exclusive of a low-pass filter, of the image pickup device 20, is placed between the lens system and the image plane I. All the lenses in this example are formed of a plastic material. Numerical data of this lens system will be shown later. An a spherical surfaces is used for the surface of the third lens unit G3 that is closest to the object side, and another a spherical surface is used for the object-side surface of the fourth lens unit G4. Aberrations in this example at the wide-angle end are shown in FIG. 5. Aberrations at the standard position are shown in FIG. 6. Aberrations at the telephoto end are shown in FIG. 7.

In Example 2, the value concerning the condition (1) is $\phi/P\times\sqrt{(2.5/N)}$=2.56 (wide-angle end), 2.72 (standard position), and 3.291 (telephoto end). The value concerning the condition (2) is P=0.0042 millimeters. The value concerning the condition (3) is N=3.289 million. The value concerning the condition (6) is $|H/L|$=0.137. Example 2 satisfies all the conditions at all focal lengths. Accordingly, it is possible to obtain a compact and low-cost image pickup apparatus wherein even when an image obtained is enlarged to 8×10" size or larger, it is possible to obtain a high-quality image that is comparable to silver halide photographs. In addition, the depth of field can be controlled with an aperture number exceeding F4. It should be noted that this example is arranged such that the aperture size can be stepwisely or continuously adjusted from the F-number at the full aperture to the neighborhood of F16.

Numerical data concerning the optical system 10 in each of the above-described examples will be shown below. In the following: reference character f denotes the focal length of the entire system; $F_{NO}$ is F-number; $2\omega$ is the field angle; $f_B$ is the back focus; $r_1$, $r_2$ . . . are the radii of curvature of lens surfaces; $d_1$, $d_2$ . . . are the spacings between adjacent lens surfaces; $n_{d1}$, $n_{d2}$ . . . are the refractive indices of the lenses for the spectral d-line; and $v_{d1}$, $v_{d2}$ . . . are the Abbe's numbers of the lenses. Assuming that x is taken in the direction of the optical axis, where the direction of travel of light is defined as a positive direction, and y is taken in a direction perpendicular to the optical axis, an aspherical configuration is expressed by $$x=(y^2/r)/[1+\{1-P(y/r)^2\}^{1/2}]+A_4y^4+A_6y^6+A_8y^8+A_{10}y^{10}$$

where r is a paraxial curvature radius; P is a conic coefficient; and $A_4$, $A_6$, $A_8$ and $A_{10}$ are 4th-, 6th-, 8th- and 10th-order aspherical coefficients, respectively.

EXAMPLE 1 f=5.12
$F_{NO}$=2.8
$2\omega$=63.37°
$f_B$=3.9118

| | | | |
|---|---|---|---|
| $r_1$ = 13.2689 | $d_1$ = 2.3000 | $n_{d1}$ = 1.84666 | $v_{d1}$ = 23.78 |
| $r_2$ = 53.6681 | $d_2$ = 0.2500 | | |
| $r_3$ = 5.0828 | $d_3$ = 0.7500 | $n_{d2}$ = 1.48749 | $v_{d2}$ = 70.20 |
| $r_4$ = 1.9499 | $d_4$ = 1.7661 | | |
| $r_5$ = ∞ (Stop) | $d_5$ = 1.1000 | | |
| $r_6$ = −8.4429 | $d_6$ = 0.8000 | $n_{d3}$ = 1.84666 | $v_{d3}$ = 23.78 |
| $r_7$ = 9.5020 | $d_7$ = 3.5000 | $n_{d4}$ = 1.72916 | $v_{d4}$ = 54.68 |
| $r_8$ = −4.4294 | $d_8$ = 0.1500 | | |
| $r_9$ = 9.0885 | $d_9$ = 3.6000 | $n_{d5}$ = 1.60311 | $v_{d5}$ = 60.68 |
| $r_{10}$ = −18.2764 (Aspheric) | $d_{10}$ = 1.5000 | | |
| $r_{11}$ = ∞ | $d_{11}$ = 0.7500 | $n_{d6}$ = 1.48749 | $v_{d6}$ = 70.20 |
| $r_{12}$ = ∞ | | | |

Aspherical Coefficients
10 th surface
P=1.00000
$A_4$=0.73370×10$^{-3}$
$A_6$=−0.65295×10$^{-5}$
$A_8$=0
$A_{10}$=0

EXAMPLE 2 f=9.04~15.61~26.93
$F_{NO}$=2.8~3.0~4.2
$2\omega$=60.55°~38.62°~22.73°
$f_B$=14.9208~14.9208~14.9208

| | | | |
|---|---|---|---|
| $r_1$ = 41.1141 | $d_1$ = 4.7904 | $n_{d1}$ = 1.49216 | $v_{d1}$ = 57.50 |
| $r_2$ = −664.4147 | $d_2$ = (Variable) | | |
| $r_3$ = 32.3483 | $d_3$ = 1.6000 | $n_{d2}$ = 1.49216 | $v_{d2}$ = 57.50 |
| $r_4$ = 10.4358 | $d_4$ = 8.7931 | | |
| $r_5$ = −24.1092 | $d_5$ = 2.0000 | $n_{d3}$ = 1.49216 | $v_{d3}$ = 57.50 |
| $r_6$ = 20.2995 | $d_6$ = 1.4357 | | |
| $r_7$ = 17.0475 | $d_7$ = 2.0000 | $n_{d4}$ = 1.58423 | $v_{d4}$ = 30.49 |
| $r_8$ = 41.4263 | $d_8$ = (Variable) | | |
| $r_9$ = ∞ (Stop) | $d_9$ = (Variable) | | |
| $r_{10}$ = 8.5729 (Aspheric) | $d_{10}$ = 5.4175 | $n_{d5}$ = 1.49216 | $v_{d5}$ = 57.50 |
| $r_{11}$ = −16.6940 | $d_{11}$ = 0.1500 | | |
| $r_{12}$ = −29.1412 | $d_{12}$ = 0.9800 | $n_{d6}$ = 1.58423 | $v_{d6}$ = 30.49 |
| $r_{13}$ = 9.3322 | $d_{13}$ = (Variable) | | |
| $r_{14}$ = 14.5420 (Aspheric) | $d_{14}$ = 3.5252 | $n_{d7}$ = 1.49216 | $v_{d7}$ = 57.50 |
| $r_{15}$ = −22.7125 | $d_{15}$ = (Variable) | | |
| $r_{16}$ = ∞ | $d_{16}$ = 0.8000 | $n_{d8}$ = 1.48749 | $v_{d8}$ = 70.20 |
| $r_{17}$ = ∞ | | | |

Zooming Spaces

| f | 9.04 | 15.61 | 26.93 |
|---|---|---|---|
| $d_2$ | 1.1531 | 10.2583 | 21.9662 |
| $d_8$ | 19.6098 | 7.4221 | 2.5000 |
| $d_9$ | 13.4153 | 9.2369 | 2.0000 |
| $d_{13}$ | 2.4188 | 3.9308 | 8.6180 |
| $d_{15}$ | 2.0000 | 4.0000 | 14.2771 |

Aspherical Coefficients
10 th surface
 P=1.00000
 $A_4 = -0.17594 \times 10^{-3}$
 $A_6 = -0.15213 \times 10^{-5}$
 $A_8 = -0.17058 \times 10^{-7}$
 $A_{10} = -0.15577 \times 10^{-9}$
14 th Surface
 P=1.00000
 $A_4 = -0.10902 \times 10^{-3}$
 $A_6 = 0.57701 \times 10^{-7}$
 $A_8 = -0.10359 \times 10^{-9}$
 $A_{10} = 0.60403 \times 10^{-10}$ Although the present invention has been described with regard to mainly a digital camera, it should be noted that the present invention is similarly applicable to a case where a still picture is viewed by using other image pickup apparatus (e.g. a digital video camera).

As will be clear from the foregoing description, according to the present invention, the image-forming performance of the optical system of the image pickup apparatus, the number of pixels of the image pickup device, and the pixel pitch are optimized. Therefore, it is possible to obtain a compact and low-cost image pickup apparatus that is capable of obtaining a high-quality image comparable to silver halide photographs even when the obtained image is enlarged to 8×10" size or larger and that enables the depth of field to be controlled with an aperture number exceeding F4.

What we claim is:

1. An image pickup apparatus wherein an image of an object produced by an optical system is formed on an electronic image pickup device, thereby obtaining image information concerning the object, said optical system having a structure capable of obtaining an aperture number equal to or larger than F4 by reducing a beam diameter, said image pickup apparatus satisfying the following conditions:

$$1.5 < \phi/P \times \sqrt{(2.5/N)} < 8.0 \quad (1)$$

$$0.0015 < P < 0.0055 \text{ [millimeter]} \quad (2)$$

$$2.4 < N < 20 \text{ [million]} \quad (3)$$

where φ is a size (given in millimeters) of a diameter of 90% encircled energy of a point spread function by amplitude of the optical system approximately at a center of an image plane, exclusive of low-pass action by an optical low-pass filter, for a wavelength of e-line at an aperture number of F5.6; N is the number of pixels (given in million) of the image pickup device; and P is a pixel pitch (given in millimeters) of the image pickup device.

2. An image pickup apparatus according to claim 1, which satisfies the following condition at all focus positions that may be used:

$$|H/L| < 0.20 \quad (6)$$

where H is a diagonal length of an image pickup surface of the image pickup device that is concerned with image generation, and L is a distance measured from the image pickup surface to an exit pupil position of the optical system, wherein when the optical system is a zoom lens system, L is a distance from the image pickup surface to an exit pupil position closest to the image pickup surface between a wide-angle end and telephoto end of the zoom lens system.

3. An image pickup apparatus according to claim 1 or 2, which satisfies the following condition:

$$2.0 < \phi/P \times \sqrt{(2.5/N)} < 6.5. \quad (4)$$

4. An image pickup apparatus according to claim 1 or 2, which satisfies the following condition:

$$3 < H < 17 \text{ [millimeter]} \quad (9)$$

where H is a diagonal length of an image pickup surface of the image pickup device that is concerned with image generation.

5. An image pickup apparatus according to claim 4, which satisfies the following condition:

$$4.2 < H < 12 \text{ [millimeter]}. \quad (10)$$

6. An image pickup apparatus according to claim 1 or 2, which does not use an optical low-pass filter.

7. An image pickup apparatus according to claim 1 or 2, which is a color image pickup apparatus.

\* \* \* \* \*